(12) United States Patent
Sanocki et al.

(10) Patent No.: US 7,501,099 B2
(45) Date of Patent: *Mar. 10, 2009

(54) HYBRID MOUNTING SYSTEM FOR POLLUTION CONTROL DEVICES

(75) Inventors: Stephen M. Sanocki, Stillwater, MN (US); Loyd R. Hornback, III, Stillwater, MN (US); Richard P. Merry, White Bear Lake, MN (US); Joel H. Sabean, St. Paul, MN (US); Paul D. Stroom, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 551 days.

This patent is subject to a terminal disclaimer.

(21) Appl. No.: 10/652,838

(22) Filed: Aug. 29, 2003

(65) Prior Publication Data

US 2004/0052698 A1 Mar. 18, 2004

Related U.S. Application Data

(63) Continuation of application No. 09/270,139, filed on Mar. 16, 1999, now Pat. No. 6,613,294, which is a continuation of application No. 08/666,735, filed on Jun. 18, 1996, now Pat. No. 5,882,608.

(51) Int. Cl.
*B01D 50/00* (2006.01)
(52) U.S. Cl. .................................................... 422/179
(58) Field of Classification Search ................. 422/177, 422/179, 180, 221, 222
See application file for complete search history.

(56) References Cited

U.S. PATENT DOCUMENTS

| | | |
|---|---|---|
| 3,001,571 A | 9/1961 | Hatch |
| 3,441,381 A | 4/1969 | Keith et al. |
| RE27,747 E | 9/1973 | Johnson |
| 3,801,289 A | 4/1974 | Wiley |
| 3,916,057 A | 10/1975 | Hatch et al. |
| 3,975,565 A | 8/1976 | Kendall |
| 3,996,145 A | 12/1976 | Hepburn |
| 4,011,651 A | 3/1977 | Bradbury et al. |
| 4,048,363 A | 9/1977 | Langer et al. |

(Continued)

FOREIGN PATENT DOCUMENTS

DE 2445754 4/1975

(Continued)

OTHER PUBLICATIONS

"Metal Supports for Exhaust Gas Catalysts", Paper No. 850131 SAE Technical Paper Series, 1985.

(Continued)

*Primary Examiner*—Tom Duong

(57) ABSTRACT

A pollution control device has a metal housing, a solid pollution control device disposed within the metal housing, and a mounting mat disposed between the pollution control element and the housing for positioning the pollution control element and for absorbing mechanical and thermal shock. The mounting mat includes a layer of intumescent material having at least one insert formed of a resilient, flexible, fibrous non-intumescent material. The insert is positioned along at least a portion of at least one lateral edge of the mounting mat to prevent erosion of the intumescent material and to provide a seal between the pollution control element and the housing.

27 Claims, 5 Drawing Sheets

U.S. PATENT DOCUMENTS

| | | | |
|---|---|---|---|
| 4,156,533 A | 5/1979 | Close et al. | |
| 4,181,514 A | 1/1980 | Lefkowitz et al. | |
| 4,269,807 A * | 5/1981 | Bailey et al. | 422/179 |
| 4,305,992 A | 12/1981 | Langer et al. | |
| 4,343,074 A | 8/1982 | Bailey et al. | |
| 4,376,675 A | 3/1983 | Perrotta | |
| 4,381,590 A | 5/1983 | Nonnenmann et al. | |
| 4,385,135 A | 5/1983 | Langer et al. | |
| 4,431,449 A | 2/1984 | Dillon et al. | |
| 4,612,087 A | 9/1986 | Ten Eyck | |
| 4,693,338 A | 9/1987 | Clerc | |
| 4,865,818 A | 9/1989 | Merry et al. | |
| 4,927,608 A | 5/1990 | Wörner et al. | |
| 4,929,429 A * | 5/1990 | Merry | 422/179 |
| 4,985,212 A * | 1/1991 | Kawakami et al. | 422/179 |
| 4,999,168 A * | 3/1991 | Ten Eyck | 422/179 |
| 5,008,086 A * | 4/1991 | Merry | 422/180 |
| 5,028,397 A | 7/1991 | Merry | |
| 5,151,253 A | 9/1992 | Merry et al. | |
| 5,207,989 A | 5/1993 | MacNeil | |
| 5,242,871 A | 9/1993 | Hashimoto et al. | |
| 5,254,410 A | 10/1993 | Langer et al. | |
| 5,290,522 A | 3/1994 | Rogers et al. | |
| 5,385,873 A | 1/1995 | MacNeil | |
| 5,404,716 A | 4/1995 | Wells et al. | |
| 5,408,828 A | 4/1995 | Kreucher et al. | |
| 5,419,127 A | 5/1995 | Moore, III | |
| 5,523,059 A | 6/1996 | Langer | |
| 5,686,039 A | 11/1997 | Merry | |
| 5,882,608 A * | 3/1999 | Sanocki et al. | 422/179 |
| 6,613,294 B2 * | 9/2003 | Sanocki et al. | 422/179 |

FOREIGN PATENT DOCUMENTS

| | | |
|---|---|---|
| DE | 80 19 813 | 10/1980 |
| DE | 3432283 A1 | 9/1984 |
| DE | 3700070 | 7/1988 |
| DE | 3835841 | 4/1990 |
| DE | 3939392 | 6/1990 |
| DE | 4009945 | 10/1991 |
| DE | 4220988 | 1/1994 |
| DE | 43 23 791 A1 | 1/1995 |
| DE | 3820981 | 12/1999 |
| EP | 0256416 | 2/1988 |
| EP | 0370222 | 5/1990 |
| EP | 639700 A1 | 8/1994 |
| EP | 639701 A1 | 8/1994 |
| EP | 639702 A1 | 8/1994 |
| EP | 639700 * | 2/1995 |
| EP | 643 204 A2 | 3/1995 |
| FR | 93 03533 | 9/1994 |
| GB | 1452982 | 10/1976 |
| GB | 1488649 | 10/1977 |
| GB | 1522646 | 8/1978 |
| GB | 2171180 A | 8/1986 |
| JP | 61-181816 U | 11/1986 |
| WO | WO 91/19081 | 12/1991 |

OTHER PUBLICATIONS

"Cellular Ceramic Diesel Particulate Filter", Paper No. 810114, SAE Technical Paper Series, 1981.

Engineering drawing entitled "Pot Cata Assemble" (Sep. 9, 1993).

Patent Abstracts of Japan, vol. 11, No. 155 (M-589), May 20, 1987 and JP 61 286512(A) Dec. 17, 1986 (abstract).

* cited by examiner

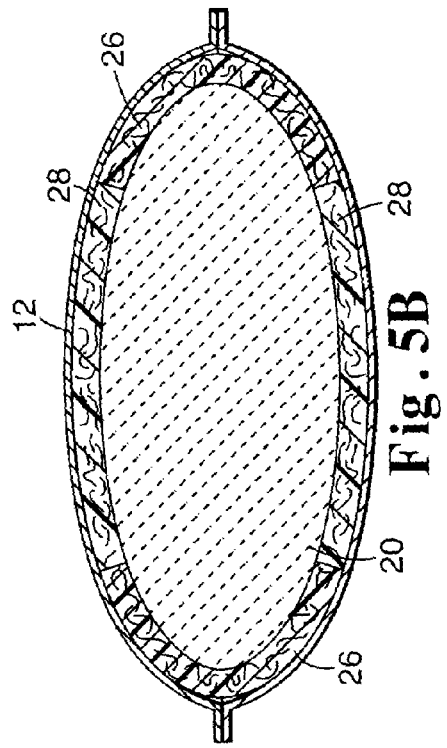
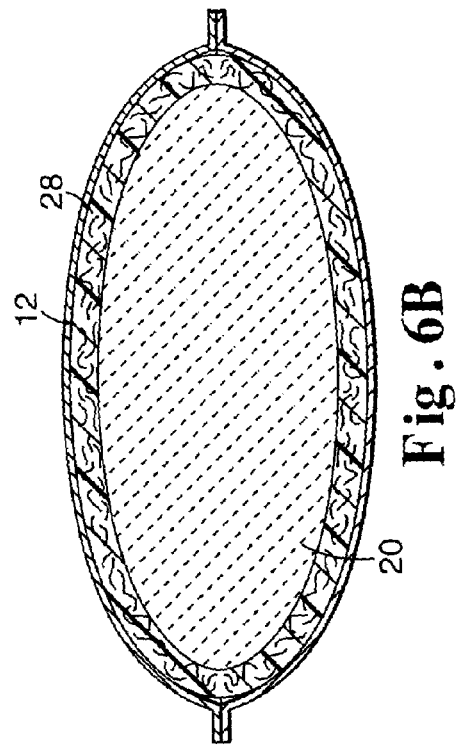
Fig. 5A
Fig. 6A
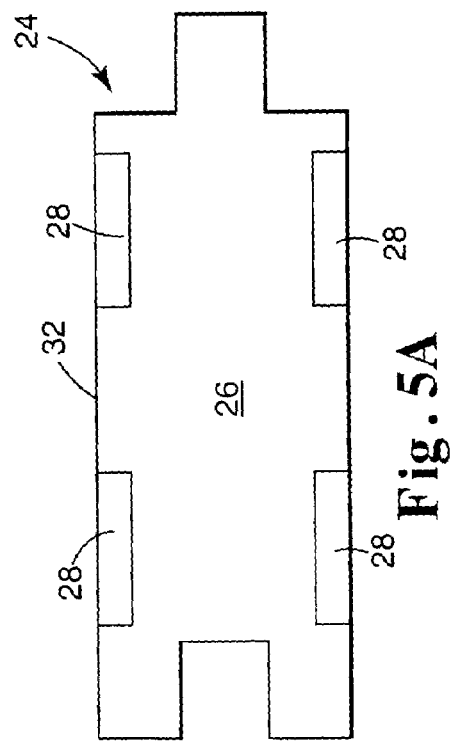
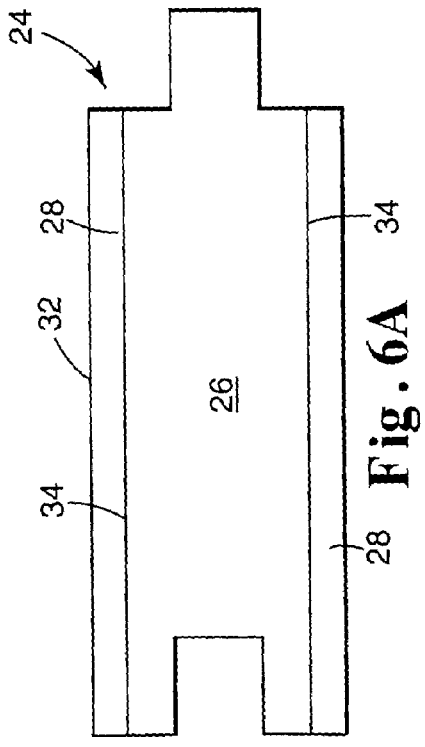
Fig. 5B
Fig. 6B

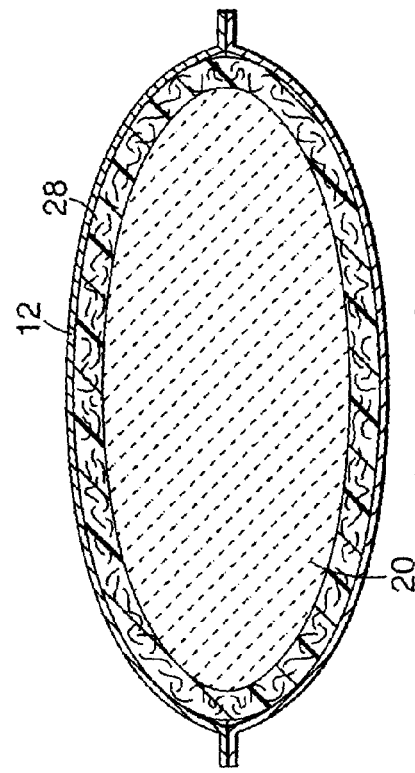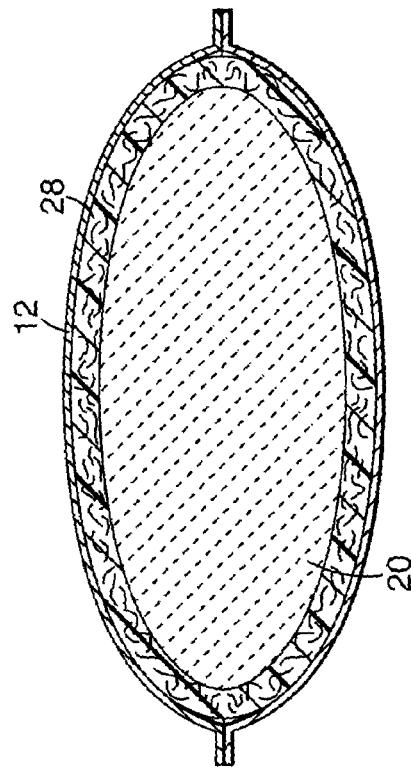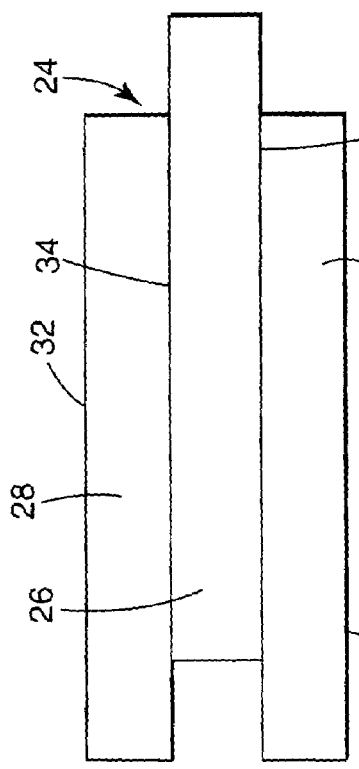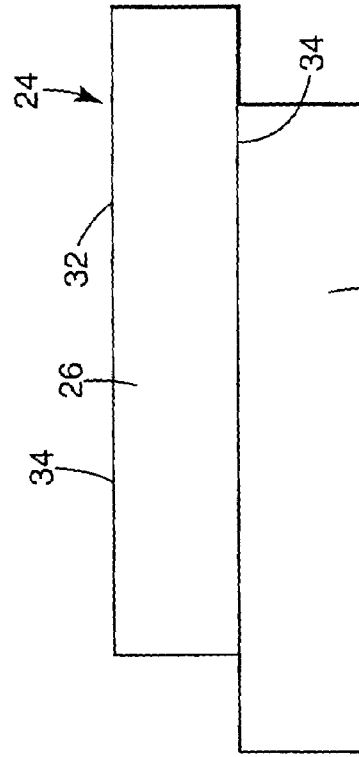

HYBRID MOUNTING SYSTEM FOR POLLUTION CONTROL DEVICES

CROSS REFERENCE TO RELATED APPLICATIONS

This application is a continuation of U.S. Ser. No. 09/270,139, filed Mar. 16, 1999, issued as U.S. Pat. No. 6,613,294, which is a continuation of U.S. Ser. No. 08/666,735, filed Jun. 18, 1996, issued as U.S. Pat. No. 5,882,608.

BACKGROUND OF THE INVENTION

The present invention relates to pollution control devices, and particularly to catalytic converters and diesel particulate filters or traps for an automotive exhaust system. The pollution control devices typically comprise a metal housing with a monolithic element securely mounted within the casing by a resilient and flexible mounting mat. The mounting mat is comprised of an intumescent sheet material having inserts formed of a non-intumescent ceramic fiber composite.

Pollution control devices are universally employed on motor vehicles to control atmospheric pollution. Two types of devices are currently in wide spread use—catalytic converters and diesel particulate filters or traps. Catalytic converters contain a catalyst, which is typically coated on a monolithic structure mounted in the converter. The monolithic structures are typically ceramic, although metal monoliths have been used. The catalyst oxidizes carbon monoxide and hydrocarbons, and reduces the oxides of nitrogen in automobile exhaust gases to control atmospheric pollution. Due to the relatively high temperatures encountered in these catalytic processes, ceramics have been the natural choice for catalyst supports. Particularly useful catalyst supports are provided by ceramic honeycomb structures as described, for example, in U.S. Pat. No. Re. 27,747.

More recently, catalytic converters utilizing metallic catalyst supports (metallic monoliths) have also been used for this purpose. (See for example, in U.K. Patent No. 1,452,982, U.S. Pat. No. 4,381,590 and SAE paper 850131).

The most common diesel particulate filters or traps are monolithic wall-flow filters. These monolithic wall-flow type diesel particulate filter elements are typically comprised of honeycombed, porous, crystalline ceramic (e.g., cordierite) material. Alternate cells of the honeycombed structure are typically plugged such that exhaust gas enters in one cell and is forced through the porous wall of one cell and exits the structure through another cell. The size of the diesel particulate filter element depends on the particular application needs. Useful diesel particulate filter elements are commercially available, for example, from Corning Inc. of Corning, N.Y., and NGK Insulator Ltd. of Nagoya, Japan. Useful diesel particulate filter elements are discussed in "Cellular Ceramic Diesel Particulate Filter," Howitt et al., Paper No. 810114, SAE Technical Paper Series, 1981.

In the state of the art construction of these devices, each type of device has a metal housing which holds within it a monolithic structure or element that can be metal or ceramic, and is most commonly ceramic. The monolithic structure is mounted in the housing in a process referred to as canning. There is a gap or space between the monolith and the housing which varies because there is a range of size tolerances for both the monolith and the housing. The largest gap exists when the monolith is on the small end of the range and the housing is on the large end of the range. To avoid damage to the monolith and to hold it in place a mounting material, such as an intumescent mounting mat or an intumescent paste, is typically disposed around the monolith before canning. The mounting material fills the gap. After the wrapped monolith is inserted into the housing, the can is pressed closed and flanges along the lateral edges of the housing are welded. After installation on the vehicle, the pollution control device is heated by the hot exhaust gases which expand the intumescent materials generating additional holding pressure. The amount of pressure is determined by the mount density of the materials and the temperatures of use. If the mount density is too low, there will be insufficient pressure to hold the monolith in place. If the mount density is too high, excessive pressure can be exerted by the mounting material between the housing and the monolith causing deformation of the housing and/or damage to the monolith.

After the monolith has been secured in the housing, the intumescent mounting material serves to avoid or reduce damage from other conditions that can be problematic to the pollution control device. The device can be subjected to damaging vibrations both before and after installation in a vehicle. Additionally, the entire device is subjected to elevated temperatures, e.g., over 300° C., for various periods of time.

A ceramic monolith has a coefficient of thermal expansion generally an order of magnitude less than the metal (usually stainless steel) housing in which it is contained, so that at elevated temperatures, the mounting materials must expand sufficiently to compensate for the differential expansion, but not so much as to create excessive pressure which can damage the housing or the monolith. The mounting material also prevents hot exhaust gases from passing between the monolith and the metal housing (thereby bypassing the catalyst).

Typically, the mounting materials include inorganic binders, inorganic fibers that may also serve as a binder, intumescent materials, and optionally, organic binder, fillers and other adjuvants. The materials are used as pastes, sheets, and mats. Ceramic mat materials, ceramic pastes, and intumescent sheet materials useful for mounting the monolith in the housing are described in, for example, U.S. Pat. No. 3,916,057 (Hatch et al.), U.S. Pat. No. 4,305,992 (Langer et al.), U.S. Pat. No. 4,385,135 (Langer et al.), U.S. Pat. No. 5,254,410 (Langer et al.), U.S. Pat. No. 5,242,871 (Hashimoto et al.), U.S. Pat. No. 3,001,571 (Hatch), U.S. Pat. No. 5,385,873 (MacNeil), U.S. Pat. No. 5,207,989 (MacNeil), and Great Britain Patent 1,522,646 (Wood).

U.S. Pat. No. 4,999,168 to TenEyck describes a crack resistant intumescent sheet having a preformed intumescent layer adhesively bonded to a reinforcing layer of a sheet material such as craft paper, plastic film, inorganic fabric.

U.S. Pat. No. 4,865,818 to Merry et al. describes a method of producing a catalytic converter by wrapping a thin sheet of mat material around the monolith at least twice in a layer wise fashion.

U.S. Pat. No. 4,929,429 to Merry describes a composite for catalytic converters having a ceramic fiber mat stitched-bonded to an intumescent mat material.

U.S. Pat. No. 4,048,363 to Langer et al. describes a composite having at least two layers of similar sheets of intumescent materials.

As the pollution control device is cycled between high and low temperatures, the size of the gap between the monolith (metal or ceramic) and the housing continuously changes, and the mounting mat is repeatedly compressed and uncompressed. In cases where the housing reaches very high temperatures, i.e., greater than about 700° C., deformation of the housing can occur. In these cases, conventional intumescent mat mounting material may lack the high temperature resiliency to provide continued support for the monolith. A need thus exists for a mounting system which is sufficiently resilient and compressible to accommodate the changing gap between the monolith and the metal housing without causing deformation of the metal housing. Further, while the state of the art mounting materials have their own utilities and advantages, there remains an ongoing need to improve mounting materials for use in pollution control device. Additionally, it would be desirable to provide materials that function well over a broader temperature range.

SUMMARY OF THE INVENTION

The present invention provides a hybrid mounting system for pollution control devices which utilize a monolith structure within a metal housing. The mounting system comprises a mounting mat disposed between the monolith and the metal housing of the pollution control device. The mounting system includes one or more inserts formed of a resilient, flexible, fibrous non-intumescent material positioned alongside a peripheral or a lateral edge of the mounting mat. In a preferred embodiment, the mounting mat is an intumescent material, and the resilient, flexible, fibrous insert is formed of a non-intumescent material. The hybrid mounting mat is useful for protecting fragile monolithic structures in catalytic converters, diesel particulate filters, and high temperature filters. The hybrid mounting mat offers the advantage of being able to combine the properties of the intumescent mounting mat and the non-intumescent inserts.

BRIEF DESCRIPTION OF THE DRAWINGS

FIG. 5A shows an alternative embodiment of a mounting system of the present invention.

FIG. 5B shows the mounting system of FIG. 5a disposed about a monolith.

FIG. 6A shows an alternative embodiment of a mounting system of the present invention.

FIG. 6B shows the mounting system of FIG. 6a disposed about a monolith.

FIG. 7A shows an alternative embodiment of a mounting system of the present invention.

FIG. 7B shows the mounting system of FIG. 7a disposed about a monolith.

FIG. 8A shows an alternative embodiment of a mounting system of the present invention.

FIG. 8B shows the mounting system of FIG. 7a disposed about a monolith.

DETAILED DESCRIPTION OF THE INVENTION

Although the mounting system of the present invention is suitable for use in a variety of pollution control devices, such as catalytic converters and diesel particulate filters or traps, its use is described herein in connection with a catalytic converter. The description is intended to be illustrative of the use of the mounting system of the present invention and should not be construed as limiting the use of the mounting system to catalytic converters.

Figure 1:
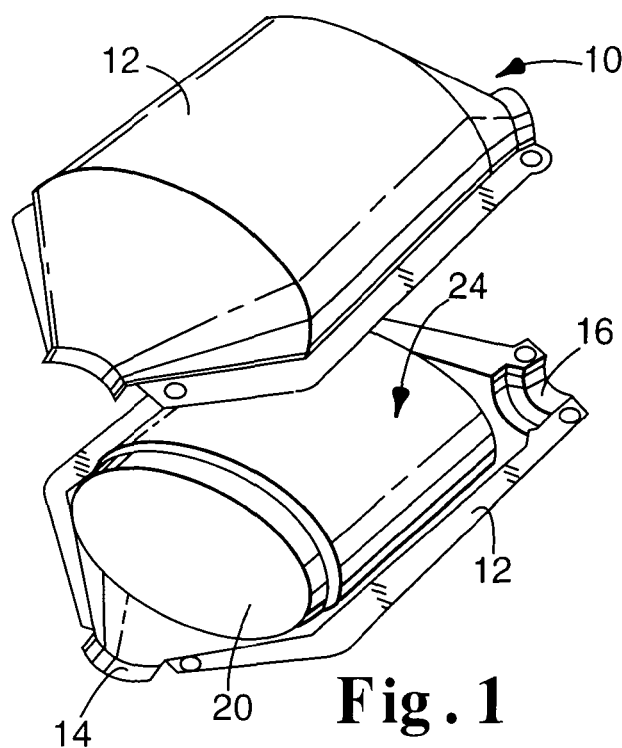
FIG. 1 is a perspective exploded view of a catalytic converter showing the mounting system of the present invention.
Figure 2:
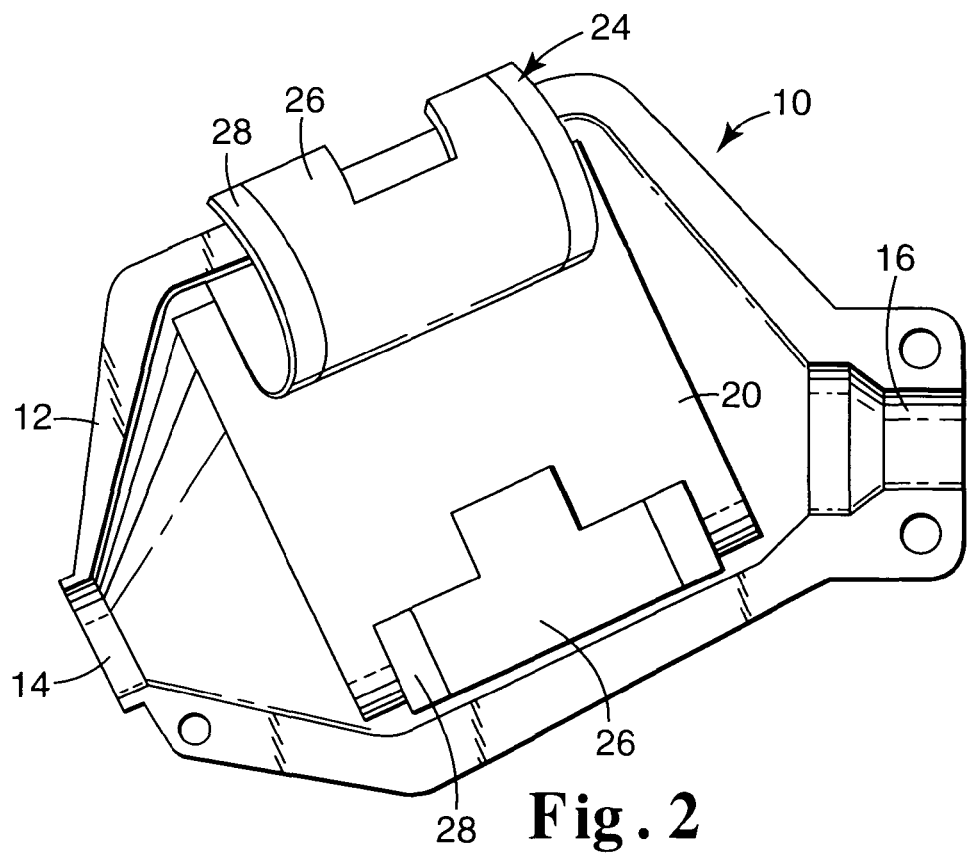
FIG. 2 is a view of the catalytic converter of FIG. 1, showing the mounting system of the present invention peeled away from the monolith.

Referring now to FIGS. 1 and 2, catalytic converter 10 comprises metallic housing 12 with generally conical inlet 14 and outlet 16. The housing, which is also referred to as a can or a casing, can be made from suitable materials known in the art for such use and is typically made of metal. Preferably, the housing is made of stainless steel.

Disposed within housing 12 is a monolithic catalytic element 20 formed of a honeycombed monolithic body either of ceramic or metal. Suitable catalytic converter elements, also referred to as monoliths, are known in the art and include those made of metal or ceramic. The monoliths or elements are used to support the catalyst materials for the converter. A useful catalytic converter element is disclosed, for example, in U.S. Pat. No. RE 27,747 (Johnson). Monolith 20 has a plurality of gas flow channels (not shown) therethrough. The catalyst materials coated onto the catalytic converter elements include those known in the art (e.g., metal such as ruthenium, osmium, rhodium, iridium, nickel, palladium, and platinum, and metal oxides such as vanadium pentoside and titanium dioxide). For further details regarding catalytic coatings see, for example, U.S. Pat. No. 3,441,381 (Keith et al.).

Surrounding monolith 20 is hybrid mounting system 24. Mounting system 24 comprises a mat 26 of intumescent material having inserts 28 formed of a resilient, flexible, fibrous mat of essentially shot-free ceramic fiber. Inserts 28 are disposed such that at least one edge of insert 28 extends along a lateral edge of intumescent mat 26.

Figure 3B:
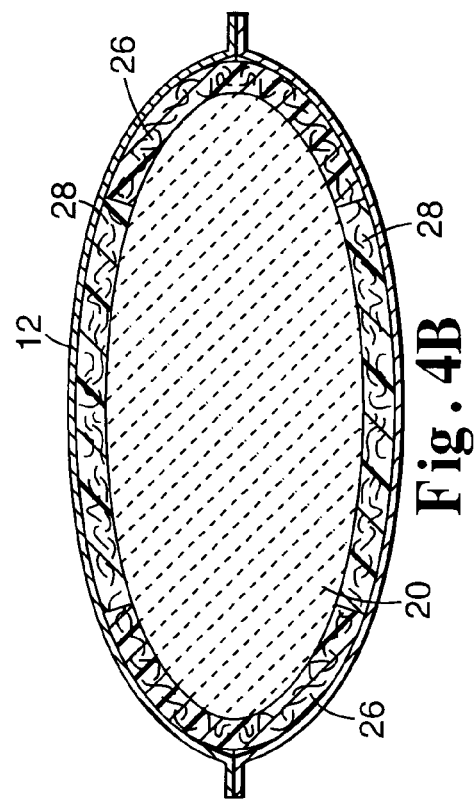
FIG. 3B shows the mounting system of FIG. 3a disposed about a monolith.
Figure 3A:
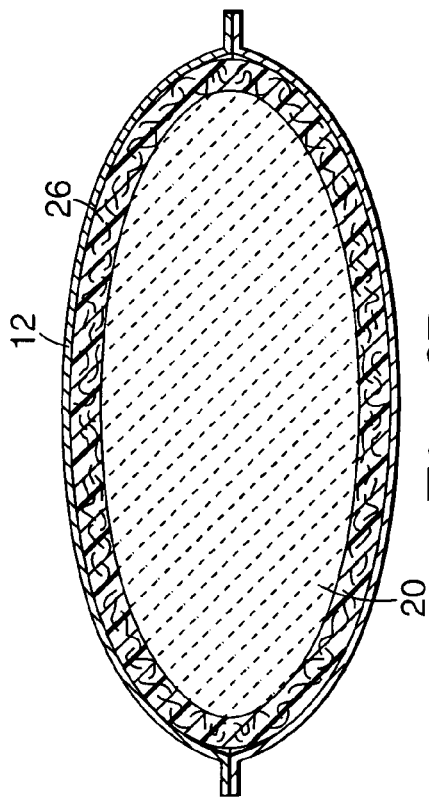
FIG. 3A shows a prior art bonding system comprised of an intumescent material.

As seen in FIGS. 4A-8B, there are numerous manners in which insert 28 may be positioned alongside intumescent mat 26 such that it extends out beyond and along an edge of intumescent mat 26. FIGS. 3A and 3B illustrate an intumescent mat 26 without insert 28. FIG. 3A provides a cross-section view of intumescent mat 26 disposed between casing 12 and monolith 20.

Figure 4B:
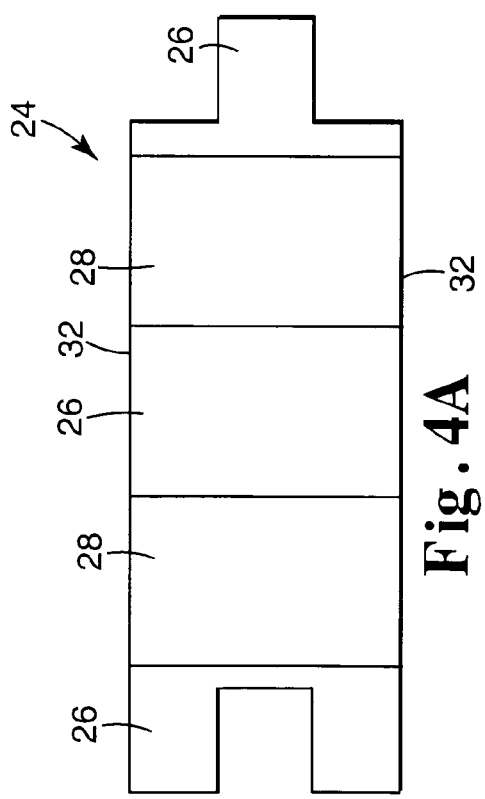
FIG. 4B shows the mounting system of FIG. 4a disposed about a monolith.
Figure 4A:
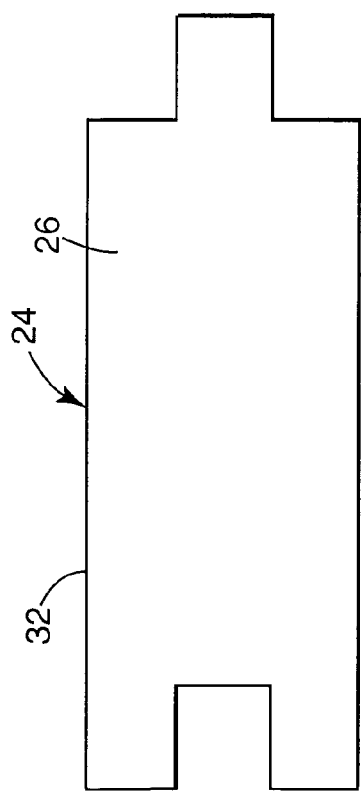
FIG. 4A shows a preferred embodiment of the mounting system of the present invention.

FIGS. 4A and 4B show non-intumescent inserts 28 alternating with intumescent mat 26, such that lateral edge 32 of mounting system 24 presents alternating sections of intumescent and non-intumescent material. As illustrated in FIG. 4B, when mounting system 24 is positioned around monolith 20 within casing 12, non-intumescent inserts 28 are preferably positioned along the portion of monolith 20 having the largest radius of curvature. Inserts 28 are preferably positioned along the portion of monolith 20 having the largest radius of curvature because this area corresponds to the portion of casing 12 most likely to deform under excessive pressure caused by compression of mounting system 24. As noted above, in cases where the pollution control device reaches very high temperatures, i.e., greater than about 700° C., deformation of the housing can occur. At these high temperatures, conventional intumescent mounting materials greatly expand, and the resultant pressure exerted on the interior of casing 12 is very high. In addition, at such high temperatures the metal of the casing (typically stainless steel) begins to soften and becomes more susceptible to deformation. By positioning non-intumescent inserts 28 at the points most likely to experience deformation under high temperature conditions, mounting system 24 generates less damaging force at high temperatures, such that deformation of casing 12 is greatly reduced.

FIGS. 5A and 5B show an embodiment of mounting system 24 similar to that of FIGS. 4A and 4B. In the embodiment of FIGS. 5A and 5B, the inserts 28 do not extend throughout the width of intumescent mat 26. When positioned about monolith 20, non-intumescent inserts 28 are positioned in a manner like that described above for FIG. 4B.

FIGS. 6A and 6B show yet another alternative embodiment of mounting system 24 in which non-intumescent inserts 28 extend along the entire length of lateral edge 34 of intumescent sheet material 26 such that when mounting system 24 is disposed about monolith 20, the lateral edge 34 of intumescent sheet material 26 is protected by insert 28.

Yet another embodiment of mounting system 24 is shown in FIGS. 7A and 7B. In FIG. 7A, mounting system 24 is shown to include inserts 28 which extend along the lateral edges 34 of the intumescent sheet material 26, but are offset from the intumescent sheet material to form the tab end slot configuration seen to be a laminate of intumescent material 26 and non-intumescent material 28.

Finally, another embodiment of mounting system 24 is shown in FIGS. 8A and 8B. The mounting system of FIGS. 8A and 8B is similar to the mounting system of FIGS. 7A and 7B, but insert 28 extends only along one lateral edge 34 of intumescent sheet material 26. Insert 28 is offset from intumescent sheet material 26 to form interlocking ends.

In each of the embodiments of FIGS. 4A-8B, inserts 28 may be secured to intumescent mat 26 by an adhesive tape (not shown) such as packaging tape or other suitable adhesive tape. Alternatively, inserts 28 do not have to be secured with tape or they may be secured by other techniques such as stapling, stitching, and the like.

Figure 9:
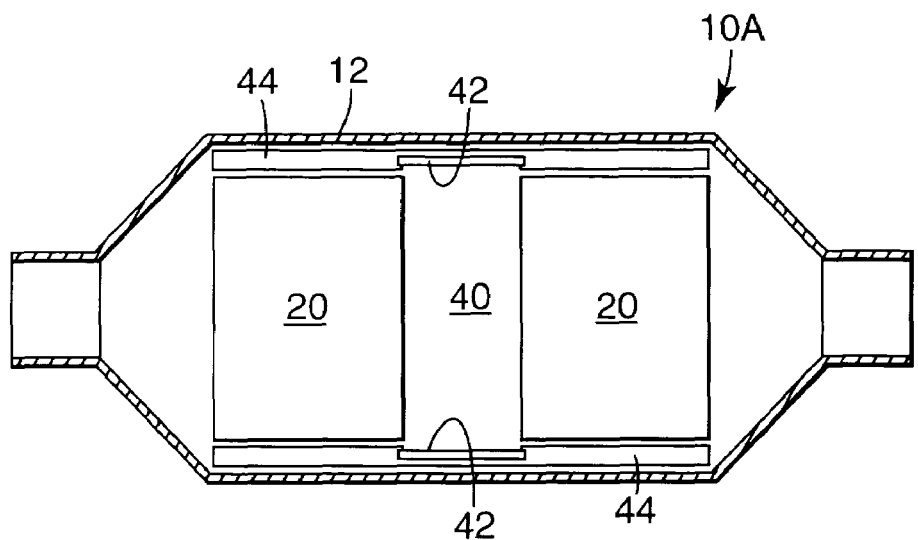
FIG. 9 shows an alternative embodiment of a catalytic converter having a dual monolith.

In some instances, a pollution control device may use dual monoliths, rather than a single monolith. For example, FIG. 9 shows a prior art catalytic converter 10A which has two monoliths 20 within a metal housing 12 and which are separated by a gap 40. In such a dual monolith configuration, it is known to align a metal strip 42 with the gap 40 between the monoliths 20. (See, for example, German Patent DE 43 23 791 A1). The metal strip is typically made from high temperature corrosion resistant metals such as Inconel and stainless steel. The metal strip can take the form of a metal foil, corrugated metal foil, a metal fabric and the like. The metal strip 42 expands at a rate very close to that of metal housing 12. Because metal strip 42 expands at a rate similar to that of housing 12, the portion of mounting mat 44 between metal strip 42 and housing 12 tends to be compressed to a greater degree than the portion of mounting mat 44 between monoliths 20 and housing 12. If the portion of mounting mat 44 between metal strip and housing 12 is compressed excessively, deformation of either housing 12 or metal strip 42 can result.

As seen in FIG. 9, prior art mounting mats typically provided a continuous layer of mounting mat 44 between metal strip 42 and housing 12. As described above, this arrangement can lead to deformation of either housing 12 or metal strip 42. It is therefore desirable to position a flexible, resilient fibrous insert 48 along metal strip 42 between metal strip 42 and housing 12. Preferably, insert 48 is a material such as SAFFIL mat, available from ICI Chemicals and Polymers. As discussed above, such inserts are capable of compressing with less force than typically used mounting materials, such that deformation of casing 12 or metal strip 42 is avoided.

Figure 10:
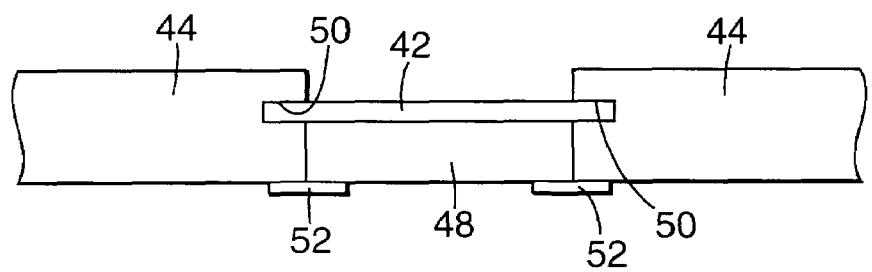
FIG. 10 shows an alternative embodiment of the mounting system of the present invention.
Figure 11:
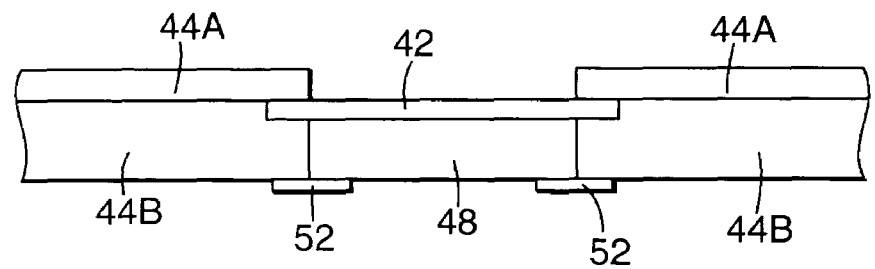
FIG. 11 shows yet another alternative embodiment of the mounting system of the present invention.

FIGS. 10 and 11 show alternative embodiments of the mounting system of FIG. 9 which uses a flexible, resilient, fibrous non-intumescent insert positioned along metal strip 42 between metal strip 42 and housing 12. In FIG. 10, metal strip 42 is inserted into routed portions 50 of mounting mat 44, and insert 48 is secured adjacent metal strip 42 with adhesive tape 52. In FIG. 11, metal strip 42 is sandwiched between layers of mounting mat 44A and 44B (such that no rotating of mounting mat material is required). Flexible, resilient, fibrous insert 48 is then inserted between mounting mat portions 44B and secured in place with adhesive tape 52. Either of the embodiments of FIG. 10 or FIG. 11 prevent excessive compression of material between metal strip 42 and housing 12, and thereby avoid deformation of either metal strip 42 or housing 12.

In use, the mounting materials of the invention are disposed between the monolith and the housing in similar fashion for either a catalytic converter or for a diesel particulate filter. This may be done by wrapping the monolith with a sheet of the mounting material, inserting the wrapped monolith into the housing, and welding the housing. Mounting system 24 holds catalytic monolith 20 in place in casing 12 and seals the gap between catalytic monolith 20 and casing 12, to thus preventing exhaust gases from bypassing catalytic monolith 20.

Intumescent sheet material 26 comprises a resilient, flexible intumescent sheet comprising from about 20 to 65 percent by weight of unexpanded vermiculite flakes, such flakes being either untreated or treated by being ion exchanged with ammonium compound such as ammonium dihydrogen phosphate, ammonium carbonate, ammonium chloride or other suitable ammonium compound; from about 10 percent to 50 percent by weight of inorganic fibrous material including aluminosilicate fibers (commercially available under the tradenames FIBERFRAX™ from Unifrax Co., Niagara Falls, N.Y., and CERAFIBER™ from Thermal Ceramics, Augusta, Ga.) asbestos fibers, glass fibers, zirconia-silica, and crystalline alumina whiskers; from about 3 to 25 percent by weight of binder including natural rubber lattices, styrene-butadiene lattices, butadiene acrylonitrile lattices, lattices of acrylate or methacrylate polymers and copolymers and the like; and up to about 40 percent by weight of inorganic filler including expanded vermiculite, hollow glass microspheres and bentonite. Useful sheet materials also include those described in U.S. Pat. No. 5,523,059 (Langer) the entire content of which is incorporated herein by reference.

Further, examples of intumescent sheet materials include those described in U.S. Pat. No. 3,916,057 (Hatch et al.), U.S. Pat. No. 4,305,992 (Langer et al.), U.S. Pat. No. 4,385,135 (Langer et al.), U.S. Pat. No. 5,254,410 (Langer et al.), U.S. Pat. No. 4,865,818 (Merry et al.), U.S. Pat. No. 5,151,253 (Merry et al.), and U.S. Pat. No. 5,290,522 (Rogers et al.), each of which are hereby incorporated by reference. Useful commercially available intumescent sheets and mats includes those sold under the INTERAM™ tradename by Minnesota Mining & Manufacturing Co. of St. Paul, Minn. The mounting mats typically range in thickness from 0.5 to 10 mm.

Additionally, useful intumescent mounting materials include intumescent pastes such as those described in U.S. Pat. No. 5,686,039 (Merry), the entire content of which is incorporated herein by reference.

Organic binders include those described above such as natural rubber lattices, styrene-butadiene lattices, butadiene acrylonitrile lattices, and lattices of acrylate and methacrylate polymers and copolymers.

Inorganic fillers include expanded vermiculite, hollow glass microspheres, and bentonite. Preferably, the inorganic fillers are expanded vermiculite.

Essentially shot-free ceramic fibers useful in forming non-intumescent inserts 28 include alumina-boria-silica fibers, alumina-silica fibers, alumina-phosphorus pentoxide fibers, zirconia-silica fibers, zirconia-alumina fibers, and alumina fibers. Useful commercially available fibers include those under the tradenames FIBERMAX fibers, available from Unifrax, SAFFIL LD fibers, available from ICI Chemicals & Polymers, ALCEN alumina fibers available from Denka, and MAFTECH fibers, available from Mitsubishi.

The fibers are typically formed by blowing or spinning using methods known in the industry. Preferably, the fibers are formed by spinning a sol gel solution. The fibers are formed into a mat by various known methods including blowing the fibrous material onto a collection screen as is practiced in the nonwoven industry. A preferred non-intumescent material is a polycrystalline alumina fiber, available under the tradename SAFFIL from ICI Chemicals and Polymers. The fiber is chemically resistant and may be used in selected applications up to 1600° C. It is produced in a low density mat form which consists of a predominately two-dimensional random orientation of fiber resulting in a mat of lamella form. The mat is essentially shot-free with a uniform fiber structure.

The lamella nature of the low density mat makes it necessary to introduce a means for preventing delamination during handling and assembly in the pollution control device. That is, the low density mat of alumina fiber is preferably physically restrained or compressed during handling and assembly. (As used herein, "shot-free" or "essentially shot-free" refers to a fiber mat which is at least 95 percent shot-free and preferably 99 percent shot-free). When compressed to a mount density of about 0.10 and 0.60 grams per cubic centimeter cubed these materials have a unique ability to repeatedly undergo a reduction in thickness while hot and spring back to substantially their original thickness when cooled, thus continually exerting a substantial holding force to catalytic monolith 20.

Since the fiber materials preferred for the non-intumescent inserts 28 are generally available in the density range of 0.020 to 0.060 grams per centimeter, they must be compressed by about a factor of 10 when used to mount catalytic monolith 20. Mats of the non-intumescent insert material are generally compressed and held in the compressed state to facilitate handling of the material during assembly of catalytic converter 10. Inserts 28 may be physically compressed in a variety of manners, including the use of resin bonding, stitch bonding, or needle punching, or vacuum packing.

Resin bonding is accomplished by saturating the non-intumescent material with organic binders which burn off in the presences of hot exhaust gas and allow the material of insert 28 to expand during use.

Because of the low density and bulky nature of shot-free ceramic fibers and the fact that they must normally be compressed by a factor of about 10 to get the desired mount density, it has also been found useful to sew or stitchbond these materials with organic thread to form a compressed mat that is closer to its ultimate thickness in use. It is sometimes useful to add a very thin sheet material as a backing layer to both sides of the fiber mat to prevent the stitches from cutting or being pulled through the fiber mat. The spacing of the stitches is usually from 3 to 30 millimeters so that the fibers are uniformly compressed throughout the entire area of the mat. The organic materials burn off when exposed to hot exhaust gas, and allow the compressed mat to expand.

The shot-free ceramic fiber may also be compressed by needle-punching. Ceramic fibers by themselves are relatively brittle and not flexible enough to be effectively needle-punched. In order to effectively needle-punch a ceramic fiber mat, the mat is first overlaid with long flexible polymeric fibers, such as polypropylene fibers or polyester fibers, that are typically about 5-10 cm long. A polymeric scrim, such as a nylon fabric or nonwoven, is placed under the mat. The mat is compressed between an upper and lower platen having numerous holes in the platen. A needle board having many small barbed needles pushes the needles through the holes. As the needles penetrate the ceramic fiber mat, the barbs pull the polymeric fibers on top of the mat through the scrim, and the polymeric fibers become entangled with the scrim to physically restrain the mat. The organic fibers and scrim will burn off when exposed to the elevated temperatures of use, and allow the ceramic fibers to expand.

The fiber mats can also be restrained by placing the fiber mat into an air-tight bag, evacuating the air from the bag, and sealing the bag. Atmospheric pressure restrains the mat in a compressed state until the bag is punctured or burned off when the pollution control device is heated to the temperature of use (over 300° C.).

The non-intumescent inserts 28 provide two important functions. Inserts 28 have superior erosion resistance when compared to the intumescent mat 26. By positioning inserts 28 along lateral edges of the intumescent material which are otherwise exposed to hot exhaust gases, inserts 28 serve to insulate intumescent mat 26 from the exhaust gas and thereby prevent erosion of intumescent mat 26. Although use of edge protection material is known, the prior art does not include an edge protection system which can expand and compress to accommodate the changing width of gap between monolith 20 and casing 12 under extreme temperature conditions or if deformation of the casing occurs. Prior edge protection mechanisms include use of a stainless steel wire screen wrapped around the edges of the intumescent mat as described in U.S. Pat. No. 5,008,086 (Merry), and braided or rope like ceramic (i.e., glass, crystalline ceramic, or glass ceramic) fiber braiding or metal wire as described in U.S. Pat. No. 4,156,533 (Close et al.). Edge protection can also be formed from compositions having glass particles as described in EP 639701A1 (Howorth et al.), EP 639702A1 (Howorth et al.), and EP 639700A1 (Stroom et al.).

Inserts 28 also act as a seal between monolith 20 and casing 12. The flexible and resilient nature of the preferred non-intumescent materials used for inserts 28 ensure that as the pollution control device is cycled between high and low temperatures, the gap between monolith 20 and casing 12 is continuously sealed, and exhaust gas is prevented from bypassing the monolith. In this manner, the efficiency of the pollution control device is maintained, and erosion of intumescent mat 26 by exhaust gas blow-by is also avoided.

Objects and advantages of this invention are further illustrated by the following examples, but the particular materials and amounts thereof should not be construed to unduly limit this invention. All parts and percentages are by weight unless stated otherwise.

EXAMPLE 1

A layer of intumescent mat material (INTERAM™ Type 100 Mat, 3100 gsm (grams per square meter) available from Minnesota Mining & manufacturing Co.) measuring 6.2 cm by 30 cm was cut as shown in FIG. 5A. Strips of a resin bonded ceramic fiber mat (1200 gsm SAFFIL™ chemically bonded mat available from ICI Chemicals & Polymers Ltd.) were cut to dimensions of 1.27 cm by 9 cm and placed in the gaps cut in the intumescent mat. The fiber mat strips were held in place with a plastic packaging tape to form a hybrid mounting mat. The hybrid mounting mat was wrapped around an oval ceramic monolith measuring 170 mm by 80 mm by 76 mm long (available from Corning). A second monolith was wrapped in the same manner with a hybrid mounting mat identical to that described above. The wrapped monoliths were mounted into a dual cavity stainless steel catalytic converter housing. The mount density of the mounting mats was determined to be 0.7 g/cc (grams per cubic centimeter) for the intumescent mat, and 0.27 g/cc for the fiber strips. The catalytic converter containing the hybrid mounting mats was then attached to a gasoline engine (Ford Motor Co. 7.5 liter displacement V-8 powered gasoline powered internal combustion engine) at 3000 rpm/220 ft lb. The catalytic converter was subjected to an inlet gas temperature of 900° C. for a duration of 100 hours.

After testing, the catalytic converter assembly was disassembled and inspected. No erosion was observed on the mounting material of the hybrid mounting mat. Additionally, there was no discoloration along the wide portion of the housing over the fiber mat strips. The presence of discoloration is indicative of hot exhaust gases passing between the mounting mat and the metal housing. The absence of any discoloration indicates the assembly was sealed sufficiently to prevent exhaust gases from flowing through the hybrid mat mounting material.

EXAMPLE 2

The mounting mats tested in this example were prepared and tested as in Example 1, except that a commercially acceptable intumescent mat material was used in place of the hybrid mounting mat used in Example 1. After testing, inspection of the mounting mat revealed that the mounting mat material had been eroded by the engine exhaust gas. The maximum erosion distance, i.e., the portion of the mounting mat that had eroded away, extended 23 mm into the edge of the mounting mat. A significant amount of discoloration was also noted on the housing.

A comparison of the performance of the mounting mats tested shows significant improvements in the performance of the hybrid mounting mat of Example 1 over the performance of the non-hybrid mounting mat of Example 2. The hybrid mounting mat resisted erosion when exposed to exhaust gases, and provided a better seal between the monolith and the housing (as evidenced by the absence of discoloration of the housing in Example 1). Clearly, the performance of the hybrid mounting mat (Example 1) is superior to the performance of a mounting mat which does not utilize the fiber mat inserts (Example 2).

Although the present invention has been described with reference to preferred embodiments, workers skilled in the art will recognize that changes may be made in form and detail without departing from the spirit and scope of the invention.

What is claimed is:

1. A pollution control device comprising:
   a housing;
   a pollution control element disposed within the housing; and
   a mounting system disposed in a gap between the pollution control element and the housing for positioning the pollution control element within the housing and for absorbing mechanical and thermal shock, the mounting system comprising:
   an intumescent mounting mat, and
   at least one resilient, flexible, fibrous non-intumescent insert that, independent of the intumescent mounting mat, can accommodate changes in the gap as the pollution control device is cycled between high and low temperatures,
   wherein the intumescent mat has a peripheral edge and the insert has a peripheral edge, and the peripheral edge of the intumescent mounting mat and the peripheral edge of the insert are juxtaposed and directly facing each other, and the insert has a greater resiliency than the intumescent mounting mat.

2. The pollution control device of claim 1, wherein the pollution control device has an inlet through which exhaust gases enter the pollution control device, the mounting system has a lateral edge that is exposed to the exhaust gases entering the pollution control device, and the insert forms the lateral edge of the mounting system that is exposed to the exhaust gases.

3. The pollution control device of claim 2, wherein the insert seals the gap between the pollution control element and the housing so as to prevent exhaust gases from bypassing the pollution control element, as the pollution control device is cycled between high and low temperatures.

4. The pollution control device of claim 1, wherein the intumescent mounting mat is a sheet material.

5. The pollution control device of claim 1, wherein the at least one insert is formed of essentially shot-free ceramic fibers.

6. The pollution control device of claim 1, wherein the pollution control element is a ceramic monolithic body.

7. The pollution control device of claim 1, wherein the insert is in a physically compressed state while disposed between the pollution control element and the housing.

8. The pollution control device of claim 1, wherein the insert comprises ceramic fiber derived from a sol-gel process.

9. The pollution control device of claim 1, wherein the housing has an inlet, the mounting system has an exposed lateral edge facing the inlet, and the exposed lateral edge is exposed to exhaust gases entering the inlet.

10. The pollution control device of claim 1, wherein the insert replaces a portion of the mounting mat.

11. The pollution control device of claim 10, wherein the insert and the mounting mat are positioned end-to-end with respect to each other.

12. The pollution control device of claim 1, wherein the insert seals a portion of the gap between the pollution control element and the housing so as to prevent exhaust gases from bypassing the pollution control element through the portion, as the pollution control device is cycled between high and low temperatures.

13. A pollution control device comprising:
   a housing;
   a pollution control element disposed within the housing; and
   a mounting system disposed in a gap between the pollution control element and the housing for positioning the pollution control element within the housing and for absorbing mechanical vibration, the mounting system comprising:
   an intumescent mounting mat having a lateral edge and being positioned in the gap, and
   at least one non-intumescent, resilient, flexible, fibrous insert positioned in the gap between the pollution control element and the housing adjacent the lateral edge of the intumescent mounting mat such that the non-intumescent insert can accommodate changes in the gap as the pollution control device is cycled between high and low temperatures, block exposure of the mounting mat to exhaust gases entering the pollution control device and reduce erosion of the lateral edge of the mounting mat by the exhaust gases, wherein the intumescent mat has a peripheral edge and the insert has a peripheral edge, and the peripheral edge of the intumescent mounting mat and the peripheral edge of the insert are juxtaposed and directly facing each other, and the resiliency of the non-intumescent insert is greater then the resiliency of the mounting mat.

14. The pollution control device of claim 13, wherein the non- intumescent insert is formed of essentially shot-free ceramic fibers.

15. The pollution control device of claim 13, wherein the non-intumescent insert extends along the entire lateral edge of the mounting mat.

16. The pollution control device of claim 13, wherein the non-intumescent insert expands to fill the gap between the housing and the pollution control element as the gap increases, when the pollution control device is exposed to high temperatures.

17. The pollution control device of claim 13, wherein the insert seals the gap between the pollution control element and the housing so as to prevent exhaust gases from bypassing the pollution control element, as the pollution control device is cycled between high and low temperatures.

18. A pollution control device comprising:
a housing;
a pollution control element disposed within the housing; and
a mounting system disposed in a gap between the pollution control element and the housing for positioning the pollution control element within the housing and for absorbing mechanical and thermal shock, the mounting system comprising:
an intumescent mounting mat, and
at least one resilient, flexible, fibrous non-intumescent insert that can accommodate changes in the gap as the pollution control device is cycled between high and low temperatures,
wherein the mounting mat has a peripheral edge, the insert has a peripheral edge, the peripheral edge of the insert and the peripheral edge of the mounting mat are juxtaposed and directly facing each other, and the insert has a greater resiliency than the mounting mat.

19. The pollution control device of claim 18, wherein the insert seals a portion of the gap between the pollution control element and the housing so as to prevent exhaust gases from bypassing the pollution control element through the portion, as the pollution control device is cycled between high and low temperatures.

20. A mounting system for mounting a pollution control element within a housing of a pollution control device, said mounting system comprising:
an intumescent mounting mat; and
at least one resilient, flexible, fibrous non-intumescent insert,
wherein the intumescent mat has a peripheral edge and the insert has a peripheral edge, and the peripheral edge of the intumescent mounting mat and the peripheral edge of the insert are juxtaposed and directly facing each other, said insert has a greater resiliency than said mounting mat, and said mounting system is suitable for absorbing mechanical and thermal shock when positioned in a gap between the pollution control element and the housing, and said insert can accommodate changes in the gap, independent of said mounting mat, as the pollution control device is cycled between high and low temperatures.

21. The mounting system of claim 20, wherein said mounting system has a lateral edge that is exposed to exhaust gases entering the pollution control device, when said mounting system is positioned in the gap of the pollution control device, and said insert forms said lateral edge.

22. The mounting system of claim 20, wherein said insert and said mounting mat are positioned end-to-end with respect to each other.

23. The mounting system of claim 20, wherein said insert replaces a portion of said mounting mat.

24. A mounting system for mounting a pollution control element within a housing of a pollution control device, said mounting system having a lateral edge that is exposed to exhaust gases entering the pollution control device, when said mounting system is positioned in a gap between the pollution control element and the housing, and said mounting system comprising:
an intumescent mounting mat having a peripheral edge; and
at least one resilient, flexible, fibrous non-intumescent insert that forms said lateral edge having a peripheral edge,
wherein the peripheral edge of said mounting mat and the peripheral edge of said insert are juxtaposed and directly facing each other, said insert has a greater resiliency than said mounting mat, said mounting system is suitable for absorbing mechanical and thermal shock when positioned in the gap between the pollution control element and the housing, and said insert can accommodate changes in the gap as the pollution control device is cycled between high and low temperatures.

25. The mounting system of claim 24, wherein said insert is suitable for sealing the gap between the pollution control element and the housing so as to prevent exhaust gases from bypassing the pollution control element, as the pollution control device is cycled between high and low temperatures.

26. A mounting system for mounting a pollution control element within a housing of a pollution control device, said mounting system having a lateral edge that is exposed to exhaust gases entering the pollution control device, when said mounting system is positioned in a gap between the pollution control element and the housing, and said mounting system comprising:
an intumescent mounting mat having peripheral edge; and
at least one resilient, flexible, fibrous non-intumescent insert having a peripheral edge,
wherein said mounting system is suitable for absorbing mechanical and thermal shock when positioned in the gap between the pollution control element and the housing, said insert can accommodate changes in the gap as the pollution control device is cycled between high and low temperatures; said insert has a greater resiliency than said mounting mat, and the peripheral edge of said insert and the peripheral edge of said mounting mat are juxtaposed and directly facing each other.

27. The mounting system of claim 26, wherein said insert is suitable for sealing a portion of the gap between the pollution control element and the housing so as to prevent exhaust gases from bypassing the pollution control element through the portion, as the pollution control device is cycled between high and low temperatures.

* * * * *

UNITED STATES PATENT AND TRADEMARK OFFICE
CERTIFICATE OF CORRECTION

PATENT NO. : 7,501,099 B2
APPLICATION NO. : 10/652838
DATED : March 10, 2009
INVENTOR(S) : Stephen M. Sanocki It is certified that error appears in the above-identified patent and that said Letters Patent is hereby corrected as shown below:

Column 4
Line 29, delete "pentoside" and insert -- pentoxide --, therefor.

Column 11
Line 8, in claim 14, delete "non- intumescent" and insert -- non-intumescent --, therefor.

Column 12
Line 47, in claim 26, delete "peripheral" and insert -- a peripheral --, therefor.
Line 55, in claim 26, delete "temperatures;" and insert -- temperatures, --, therefor.

Signed and Sealed this

Twenty-ninth Day of September, 2009

David J. Kappos
*Director of the United States Patent and Trademark Office*